(12) United States Patent
Yang (10) Patent No.: US 12,320,954 B2
(45) Date of Patent: Jun. 3, 2025

(54) POLARIZER AND DISPLAY DEVICE (71) Applicant: WUHAN CHINA STAR OPTOELECTRONICS SEMICONDUCTOR DISPLAY TECHNOLOGY CO., LTD., Hubei (CN)

(72) Inventor: Wenhua Yang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/623,009

(22) PCT Filed: Dec. 17, 2021

(86) PCT No.: PCT/CN2021/139108
§ 371 (c)(1),
(2) Date: Dec. 27, 2021

(87) PCT Pub. No.: WO2023/103035
PCT Pub. Date: Jun. 15, 2023

(65) Prior Publication Data
US 2024/0045111 A1 Feb. 8, 2024

(30) Foreign Application Priority Data
Dec. 10, 2021 (CN) .......................... 202111502707.9

(51) Int. Cl.
*G02B 1/18* (2015.01)
*G02B 1/08* (2006.01)
(Continued)

(52) U.S. Cl.
CPC ................. *G02B 1/18* (2015.01); *G02B 1/08* (2013.01); *G02B 1/14* (2015.01); *G02B 5/3025* (2013.01)

(58) Field of Classification Search
CPC ... G02B 1/08; G02B 1/14; G02B 1/18; G02B 5/3025
(Continued)

(56) References Cited

U.S. PATENT DOCUMENTS 8,824,047 B2 * 9/2014 Tomoguchi ............ G02B 1/105
349/122
9,428,676 B2 * 8/2016 Lee ........................ C09J 163/00
(Continued)

FOREIGN PATENT DOCUMENTS

| CN | 101533119 A | 9/2009 |
| CN | 205405012 U | 7/2016 |

(Continued)

OTHER PUBLICATIONS

International Search Report in International application No. PCT/CN2021/139108,mailed on May 27, 2022.
(Continued)

*Primary Examiner* — Ricky D Shafer
(74) *Attorney, Agent, or Firm* — PV IP PC; Wei Te Chung (57) ABSTRACT

A polarizer and a display device are provided. The polarizer includes a linear polarization layer, a first hydrophobic layer disposed on a first surface of the linear polarization layer, and a first protection layer disposed on a surface of the first hydrophobic layer away from the linear polarization layer. This application utilizes a hydrophobic property of the first hydrophobic layer to prevent human sweat from penetrating into an interior of the polarizer and reaching the surface of
(Continued)

the linear polarization layer, thereby preventing the sweat from corroding the linear polarization layer.

20 Claims, 3 Drawing Sheets

(51) Int. Cl.
*G02B 1/14* (2015.01)
*G02B 5/30* (2006.01)

(58) Field of Classification Search
USPC .................. 359/487.01, 489.02, 489.07
See application file for complete search history.

(56) References Cited

U.S. PATENT DOCUMENTS

| | | | |
|---|---|---|---|
| 11,079,526 B2* | 8/2021 | Mita | G02B 1/14 |
| 2005/0243252 A1* | 11/2005 | Matsuoka | G02F 1/133528 |
| | | | 349/117 |
| 2008/0112048 A1* | 5/2008 | Katou | B29D 11/0073 |
| | | | 156/60 |
| 2013/0162935 A1* | 6/2013 | Seo | G02B 5/3025 |
| | | | 349/97 |
| 2014/0254012 A1* | 9/2014 | Moon | G02B 5/305 |
| | | | 252/585 |
| 2015/0104650 A1* | 4/2015 | Yu | G02B 1/14 |
| | | | 252/183.11 |
| 2016/0018578 A1* | 1/2016 | Yonemoto | G02B 1/14 |
| | | | 156/60 |
| 2016/0370508 A1* | 12/2016 | Jeong | G02B 5/3033 |
| 2017/0210915 A1* | 7/2017 | Lee | C08F 2/44 |
| 2020/0348453 A1* | 11/2020 | Kim | H10K 59/8791 |

FOREIGN PATENT DOCUMENTS

| | | | |
|---|---|---|---|
| CN | 108121028 A | | 6/2018 |
| CN | 207440327 U | | 6/2018 |
| CN | 208207448 U | | 12/2018 |
| CN | 109298478 A | | 2/2019 |
| CN | 109343164 A | | 2/2019 |
| CN | 210136329 U | | 3/2020 |
| CN | 112147810 A | | 12/2020 |
| CN | 112946949 A | | 6/2021 |
| CN | 213843578 U | | 7/2021 |
| CN | 113471389 A | | 10/2021 |
| CN | 214672680 U | | 11/2021 |
| JP | 2003195034 A | | 7/2003 |
| JP | 2004252263 A | | 9/2004 |
| JP | 2017155223 | * | 9/2007 |
| WO | 2009025360 A1 | | 2/2009 |

OTHER PUBLICATIONS

Written Opinion of the International Search Authority in International application No. PCT/CN2021/139108,mailed on May 27, 2022.

Chinese Office Action issued in corresponding Chinese Patent Application No. 202111502707.9 dated Jun. 15, 2022, pp. 1-7.

* cited by examiner

POLARIZER AND DISPLAY DEVICE

CROSS-REFERENCE TO RELATED APPLICATIONS

This application is a 371 U.S. National Phase of International Application No. PCT/CN2021/139108, filed Dec. 17, 2021, which claims priority to Chinese Patent Application No. 202111502707.9, filed Dec. 10, 2021. The entire disclosures of the above applications are incorporated herein by reference.

FIELD OF DISCLOSURE

The present disclosure relates to the field of display technologies, in particular to a polarizer and a display device.

BACKGROUND

With the widespread use of organic light-emitting diode (OLED) display phones in the world, different regions have different requirements for the reliability of the OLED displays. For example, in the Indian market, due to a hot climate throughout India, customers using mobile phones in this environment will have problems with sweat corroding the OLED display. Therefore, OLED displays need to have a certain degree of resistance to sweat corrosion. The sweat is mainly divided into acid sweat and alkaline sweat. The alkaline sweat will cause discoloration of a polarizer in the OLED display, which in turn causes the phone to have a poor appearance. The acid sweat will not cause this problem.

SUMMARY OF DISCLOSURE

Current polarizers in displays have a technical problem of poor sweat corrosion resistance.

The present disclosure provides a polarizer and a display device, which are used to solve the technical problem of poor sweat corrosion resistance of a polarizer in a current display screen.

The present disclosure provides a polarizer, including:
a linear polarization layer;
a first hydrophobic layer disposed on a first surface of the linear polarization layer; and
a first protection layer disposed on a surface of the first hydrophobic layer away from the linear polarization layer.

In the polarizer of the present disclosure, the polarizer further includes a second hydrophobic layer and a second protection layer.

The second hydrophobic layer is disposed on a second surface of the linear polarization layer, and the first surface is opposite to the second surface.

The second protection layer disposed on a surface of the second hydrophobic layer away from the linear polarization layer.

In the polarizer of the present disclosure, the first hydrophobic layer completely covers the first surface of the linear polarization layer.

In the polarizer of the present disclosure, the second hydrophobic layer completely covers the second surface of the linear polarization layer.

In the polarizer of the present disclosure, the first hydrophobic layer is connected to the second hydrophobic layer on at least one side surface of the linear polarization layer.

In the polarizer of the present disclosure, the first hydrophobic layer and the second hydrophobic layer coat the linear polarization layer.

In the polarizer of the present disclosure, the first hydrophobic layer includes a flexible adhesive.

In the polarizer of the present disclosure, the first hydrophobic layer includes an organosilicone pressure sensitive adhesive, and the first protection layer is adhered to the linear polarization layer through the first hydrophobic layer.

In the polarizer of the present disclosure, the second hydrophobic layer includes a flexible adhesive.

In the polarizer of the present disclosure, the second hydrophobic layer includes an organosilicone pressure sensitive adhesive, and the second protection layer is adhered to the linear polarization layer through the second hydrophobic layer.

In the polarizer of the present disclosure, the polarizer further includes: a first adhesive layer disposed on a side of the linear polarization layer away from the first hydrophobic layer; a compensation layer disposed on a surface of the first adhesive layer away from the linear polarization layer; and a second adhesive layer dispose on a surface of the compensation layer away from the first adhesive layer.

In the polarizer of the present disclosure, the polarizer further includes: a first adhesive layer disposed on a surface of the second protection layer away from the second hydrophobic layer; a compensation layer disposed on a surface of the first adhesive layer away from the second protection layer; and a second adhesive layer disposed on a surface the compensation layer away from the first adhesive layer.

In the polarizer of the present disclosure, the linear polarization layer includes I3-complex and I5-complex.

In the polarizer of the present disclosure, material of the linear polarization layer includes polyvinyl alcohol.

In the polarizer of the present disclosure, material of the first protection layer includes tri-acetyl cellulose.

The present disclosure also provides a display device, including a display panel and a polarizer disposed on a light-emitting side of the display panel, wherein the polarizer includes:
a linear polarization layer;
a first hydrophobic layer disposed on a first surface of the linear polarization layer; and
a first protection layer disposed on a surface of the first hydrophobic layer away from the linear polarization layer.

In the display device of the present disclosure, the polarizer further includes a second hydrophobic layer and a second protection layer.

The second hydrophobic layer is disposed on a second surface of the linear polarization layer, and the first surface is opposite to the second surface.

The second protection layer disposed on a surface of the second hydrophobic layer away from the linear polarization layer.

In the display device of the present disclosure, the first hydrophobic layer completely covers the first surface of the linear polarization layer, and the second hydrophobic layer completely covers the second surface of the linear polarization layer.

In the display device of the present disclosure, the first hydrophobic layer and the second hydrophobic layer coat the linear polarization layer.

The present disclosure also provides a polarizer, including:
a linear polarization layer;

a first hydrophobic layer disposed on a first surface of the linear polarization layer;

a first protection layer disposed on a surface of the first hydrophobic layer away from the linear polarization layer.

a second hydrophobic layer disposed a second surface of the linear polarization layer, wherein the first surface is opposite to the second surface; and a second protection layer disposed on a surface of the second hydrophobic layer away from the linear polarization layer.

The first hydrophobic layer includes an organosilicone pressure sensitive adhesive, and the second hydrophobic layer includes an organosilicone pressure sensitive adhesive.

The present disclosure provides the polarizer and the display device. The polarizer includes the linear polarization layer, the first hydrophobic layer disposed on the first surface of the linear polarization layer, and the first protection layer disposed on the surface of the first hydrophobic layer away from the linear polarization layer. In the present disclosure, the first hydrophobic layer is disposed on the surface of the linear polarization layer. A hydrophobic property of the first hydrophobic layer is utilized to prevent human sweat from penetrating into an interior of the polarizer and reaching the surface of the linear polarization layer, thereby preventing the sweat from corroding the linear polarization layer, improving an ability of the polarizer to resist sweat corrosion, and improve its reliability in use.

BRIEF DESCRIPTION OF DRAWINGS

In order to explain technical solutions of embodiments or the prior art more clearly, the following will briefly introduce the drawings that need to be used in the description of the embodiments or the prior art. Apparently, the drawings in the following description are only for application. For some embodiments, those of ordinary skill in the art can obtain other drawings based on these drawings without creative efforts.

DETAILED DESCRIPTION

The description of the following embodiments refers to the accompanying drawings to illustrate specific embodiments that can be implemented by the present disclosure. The directional terms mentioned in the present disclosure, such as top, bottom, front, back, left, [right], inside, outside, side, etc., only refer to the direction of the accompanying drawings. Therefore, the directional terms are used to explain and understand the present disclosure, not to limit the present disclosure. In the drawings, units with similar structures are indicated by the same reference numerals.

Embodiments of the present disclosure provides a polarizer and a display device. The polarizer includes the linear polarization layer, the first hydrophobic layer disposed on the first surface of the linear polarization layer, and the first protection layer disposed on the surface of the first hydrophobic layer away from the linear polarization layer. In the present disclosure, the first hydrophobic layer is disposed on the surface of the linear polarization layer. In the embodiments of the present disclosure, the first hydrophobic layer is disposed on the surface of the linear polarization layer. A hydrophobic property of the first hydrophobic layer is utilized to prevent human sweat from penetrating into an interior of the polarizer and reaching the surface of the linear polarization layer, thereby preventing the sweat from corroding the linear polarization layer, improving an ability of the polarizer to resist sweat corrosion, and improve its reliability in use.

Structural features and functional features of the polarizer of the embodiments of the present disclosure will be described below in conjunction with the accompanying drawings.

Figure 1:
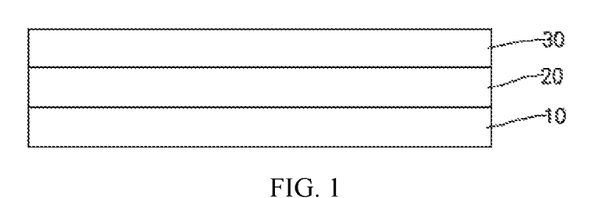
FIG. 1 is a schematic structural diagram of a first polarizer of an embodiment of the present disclosure.

In one embodiment, refer to FIG. 1. which is a schematic structural diagram of a first polarizer of the present disclosure. This embodiment provides a polarizer. The polarizer includes a linear polarization layer 10, a first hydrophobic layer 20, and a first protection layer 30. The first hydrophobic layer 20 is disposed on a surface of the linear polarization layer 10. The first protection layer 30 is disposed on a surface of the first hydrophobic layer 20 away from the linear polarization layer 10. When in use, the linear polarization layer 10 of the polarizer is assembled and fixed with a light-emitting element. The light-emitting element may be various types of display panels. For example, an organic light emitting diode display panel, a liquid crystal display panel, etc.

The linear polarization layer 10 includes $I_3^-$ complex and $I_5^-$ complex. The $I_3^-$ complex is used to absorb light in a wavelength range of 300 to 560 nanometers, and the $I_5^-$ complex is used to absorb light in a wavelength range of 395 to 700 nanometers. The linear polarization layer 10 is formed by using the $I_3^-$ complex and the $I_5^-$ complex to perform dyeing and extension processing on a film-like polyvinyl alcohol resin (PVA resin), and the $I_3^-$ complex and the $I_5^-$ complex are absorbed in the PVA resin in an aligned state. It can be understood that because of the absorption of light by the linear polarization layer 10, a display surface of a display device with the polarizer appears in a black state in a non-display state. Human sweat contains $NH_4^+$. $NH_4^+$ will react with the $I_3^-$ complex and the $I_5^-$ complex in the polarizer and cause it to fail, which will cause different degrees of discoloration on edges of the polarizer, and affect an appearance of the display device.

The first hydrophobic layer 20 is disposed on the surface of the linear polarization layer which has hydrophobic and adhesive properties. The first protection layer 30 is disposed on the surface of the first hydrophobic layer 20 away from the linear polarization layer 10, and is adhered and fixed to the linear polarization layer 10 through the first hydrophobic layer 20. The first protection layer 30 is used to protect the linear polarization layer 10 to prevent the linear polarization layer 10 from being worn by external forces. In this embodiment, the first hydrophobic layer 20 is disposed between the linear polarization layer 10 and the first protection layer 30. The connection between the linear polarization layer 10 and the first protection layer 30 is realized by using the adhesion property of the first hydrophobic layer 20. The hydrophobic property of the first hydrophobic layer 20 is used to prevent human sweat from penetrating into an interior of the polarizer. Thus, it prevents $NH_4^+$ in human sweat from reacting with the $I_3^-$ complex and the $I_5^-$ complex in the linear polarization layer 10 to cause the polarizer to fail. Therefore, this embodiment enhances an ability of the polarizer to resist sweat corrosion, and improves its reliability in use.

A specific principle of the failure of the polarizer caused by human sweat is as follows:

A reaction of the $I_5^-$ complex absorbing long wavelength light is as follows. After absorbing long wavelength light, it generates water-soluble $I_2$ and $I_3^-$ complexes, and the $I_3^-$ complex can continue to absorb short wavelength light:

$I_5^-$ (absorbing long wavelength) $\xrightarrow{water}$

$I_2 + I_3^-$ (absorbing short wavelength)

A reaction of the $I_3^-$ complex to absorb short wavelength light is as follows. After absorbing short wavelength light, it generates water-soluble $I_2$ and $I^-$ complex:

$I_3^-$ (absorbing short wavelength) $\xrightarrow{water}$ $I_2 + I^-$ (soluble in water)

$NH_4^+$ in human sweat will directly react with the $I_5^-$ complex in the linear polarization layer 10, and a product cannot absorb long wavelength light or short wavelength light, which causes both of the $I_3^-$ complex and the $I_5^-$ complex to fail. A reaction formula is as follows:

$NH_4^+ + I_5^-$ (absorbing long wavelength) $\rightarrow (NH_4)I_5$

Specifically, material of the linear polarization layer 10 is polyvinyl alcohol (PVA). Material of the first protection layer 30 is tri-acetyl cellulose (TAC) and/or COP material. Use tri-acetyl cellulose element and COP material's high strength and high wear resistance to protect polyvinyl alcohol. The tri-acetyl cellulose and COP materials with high strength and high wear resistance properties are used to protect the polyvinyl alcohol.

Furthermore, the first hydrophobic layer 20 can be made of a flexible adhesive. When the first hydrophobic layer 20 prevents sweat from corroding the linear polarization layer 10, it uses its own adhesiveness and flexibility to increase the degree of adhesion and stability between the first protection layer 30 and the linear polarization layer 10, and further to increase the ability of the polarizer to resist sweat corrosion.

Furthermore, the first hydrophobic layer 20 can be made of an organosilicone pressure sensitive adhesive. It can be understood that the organosilicone pressure sensitive adhesive has good flexibility, adhesion, hydrophobicity, $NH_4^+$ phobicity, and high temperature resistance. Thus, in this embodiment, the first hydrophobic layer 20 is made of the organosilicone pressure sensitive adhesive, which not only increases the adhesion and stability of the adhesion between the first protection layer 30 and the linear polarization layer 10, but also increases sweat corrosion resistance and high temperature resistance of the polarizer. The polarizer has a higher applicability in high temperature environments and meets the needs of some high temperature areas.

In this embodiment, the first hydrophobic layer 20 can completely cover the first surface of the linear polarization layer 10 to form an effective protection for the surface. In some other embodiments, the first hydrophobic layer 20 may also cover at least one side surface of the linear polarization layer 10 adjacent to the first surface, thereby protecting the side surface of the linear polarization layer 10 and preventing sweat from corroding the linear polarization layer 10 from the side surface of the polarizer. In some other embodiments, the first hydrophobic layer 20 may also cover all side surfaces of the linear polarization layer 10 adjacent to the first surface, and cover a surface of the linear polarization layer 10 opposite to the first surface. The first hydrophobic layer 20 forms a coating structure for the linear polarization layer 10, thereby comprehensively protecting the linear polarization layer 10, and further improving the sweat corrosion resistance of the polarizer.

Figure 2:
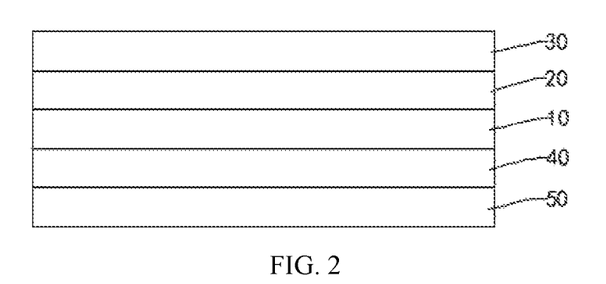
FIG. 2 is a schematic structural diagram of a second polarizer of an embodiment of the present disclosure.

In another embodiment, refer to FIG. 2, which is a schematic structural diagram of a second polarizer of an embodiment of the present disclosure. It can be understood that the polarizer of this embodiment has the same or similar features as the polarizer of the foregoing embodiments. The functions and effects of the related technical features in the above-mentioned embodiments are also applicable in this embodiment.

The polarizer of this embodiment includes a linear polarization layer 10, a first hydrophobic layer 20, a first protection layer 30, a second hydrophobic layer 40, and a second protection layer 50. The first hydrophobic layer 20 is disposed on a first surface of the linear polarization layer 10. The first protection layer 30 is disposed on a surface of the first hydrophobic layer 20 away from the linear polarization layer 10. The second hydrophobic layer 40 is disposed on a second surface of the linear polarization layer 10. The first surface is opposite to the second surface. The second protection layer 50 is disposed a surface of the second hydrophobic layer 40 away from the linear polarization layer 10. In use, one side of the first protection layer 30 or one side of the second protection layer 50 of the polarizer is combined and fixed with a light-emitting element, so as to adjust light emitted by the light-emitting element.

The linear polarization layer 10 includes $I_3^-$ complex and $I_5^-$ complex. The linear polarization layer 10 is formed by using the $I_3^-$ complex and the $I_5^-$ complex to perform dyeing and extension processing on a film-like polyvinyl alcohol resin (PVA resin), and the $I_3^-$ complex and the $I_5^-$ complex are absorbed in the PVA resin in an aligned state.

The first hydrophobic layer 20 and the second hydrophobic layer 40 are respectively disposed on two opposite surfaces of the linear polarization layer 10, and both have hydrophobic and adhesive properties. The first protection layer 30 is adhered and fixed to the first surface of the linear polarization layer 10 through the first hydrophobic layer 20. The second protection layer 50 is adhered and fixed to the second surface of the linear polarization layer 10 through the second hydrophobic layer 40. The first protection layer 30 and the second protection layer 50 are used to protect the linear polarization layer 10 to prevent the linear polarization layer 10 from being worn by external forces. In this embodiment, the first hydrophobic layer 20 is disposed between the linear polarization layer 10 and the first protection layer 30, and the second hydrophobic layer 40 is disposed between the linear polarization layer 10 and the second protection layer 50. The bonding effect of the first hydrophobic layer 20 and the second hydrophobic layer 40 is used to realize the connection of the linear polarization layer 10 with the first protection layer 30 and the second protection layer 50. The hydrophobic property of the first hydrophobic layer 20 and the second hydrophobic layer 40 prevents human sweat from penetrating into an interior of the polarizer. Thus, it is prevented that $NH_4^+$ in the human sweat reacts with the $I_3^-$ complex and the $I_5^-$ complex in the linear polarization layer 10 to cause the polarizer to fail. For the specific principle of the failure of the polarizer caused by human sweat, refer to the description of the above embodiments.

Specifically, material of the linear polarization layer 10 is polyvinyl alcohol (PVA). Material of the first protection layer 30 is tri-acetyl cellulose. The first hydrophobic layer 20 and the second hydrophobic layer 40 may be made of a flexible adhesive. When the first hydrophobic layer 20 and the second hydrophobic layer 40 prevent sweat from corroding the linear polarization layer 10, they use their own adhesiveness and flexibility to increase the degree of adhesion and stability between the first protection layer 30 and the second protection layer 50 with the linear polarization layer 10, and further to increase the ability of the polarizer to resist sweat corrosion.

Furthermore, the first hydrophobic layer 20 and the second hydrophobic layer 40 may be made of an organosilicone pressure sensitive adhesive. It can be understood that the organosilicone pressure sensitive adhesive has good flexibility, adhesion, hydrophobicity, $NH_4^+$ phobicity, and high temperature resistance. Thus, in this embodiment, the first hydrophobic layer 20 and the second hydrophobic layer 40 are made of the organosilicone pressure sensitive adhesive, which not only increases the adhesion and stability of the first protection layer 30 and the second protection layer 50 with the linear polarization layer 10, but also increases sweat corrosion resistance and high temperature resistance of the polarizer. The polarizer has a higher applicability in high temperature environments and meets the needs of some high temperature areas.

Figure 3:
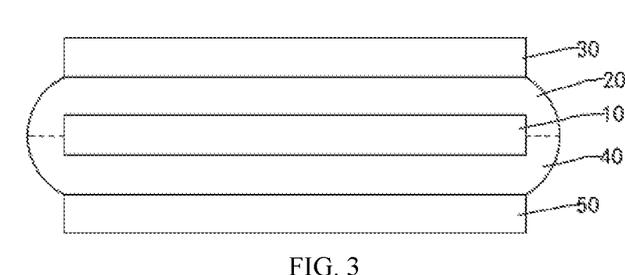
FIG. 3 is a schematic structural diagram of a third polarizer of the present disclosure from a first perspective.
Figure 4:
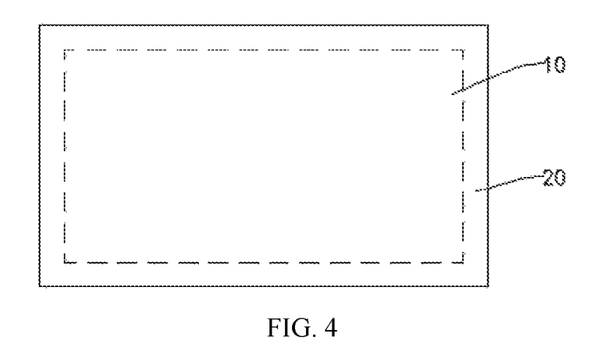
FIG. 4 is a schematic structural diagram of the third polarizer of the present disclosure from a second perspective.

Alternatively, refer to FIG. 3 and FIG. 4, FIG. 3 is a schematic structural diagram of a third polarizer of the present disclosure from a first perspective, and FIG. 4 is a schematic structural diagram of the third polarizer of the present disclosure from a second perspective. The third polarizer in this embodiment has the same or similar structural features as the polarizer described in the foregoing embodiments, and the related technical features are not repeated here. Compared with the polarizer shown in FIG. 2, the polarizer shown in FIG. 3 and FIG. 4 has at least the following different technical features.

In this embodiment, on at least one side surface of the linear polarization layer 10, the first hydrophobic layer 20 and the second hydrophobic layer 40 are connected. Thus, the first hydrophobic layer 20 and the second hydrophobic layer 40 together coat the side surface of the linear polarization layer 10 to protect the side surface of the linear polarization layer 10 and prevent sweat from corroding the linear polarization layer 10 from the side surface of the polarizer. On the side surface of the linear polarization layer 10, a connection position of the first hydrophobic layer 20 and the second hydrophobic layer 40 is not specifically limited. If necessary, the first hydrophobic layer 20 can be extended more to make the connection position closer to the second hydrophobic layer 40. Alternatively, the second hydrophobic layer 40 can be extended more so that the connection position is closer to the first hydrophobic layer 20.

Alternatively, the first hydrophobic layer 20 and the second hydrophobic layer 40 can also be connected all around the linear polarization layer 10. Thus, the first hydrophobic layer 20 and the second hydrophobic layer 40 form a coating structure for the linear polarization layer 10. At this time, the linear polarization layer 10 is completely arranged in an accommodating cavity formed by the first hydrophobic layer 20 and the second hydrophobic layer 40. The overall protection of the linear polarization layer 10 is realized, and the ability of the polarizer to resist sweat corrosion is further improved.

For this embodiment, a method of connecting the first hydrophobic layer 20 and the second hydrophobic layer 40 on the side surface of the linear polarization layer 10 may be as follows. After a large-sized polarizer including the first hydrophobic layer 20 and the second hydrophobic layer 40 is formed, the polarizer is cut. The first hydrophobic layer 20 and the second hydrophobic layer 40 are both flexible adhesive layers. Thus, in the cutting process, under the cutting force, the first hydrophobic layer 20 and the second hydrophobic layer 40 form a natural connection at a cutting position to realize automatic sealing of an edge of the linear polarization layer 10.

Figure 5:
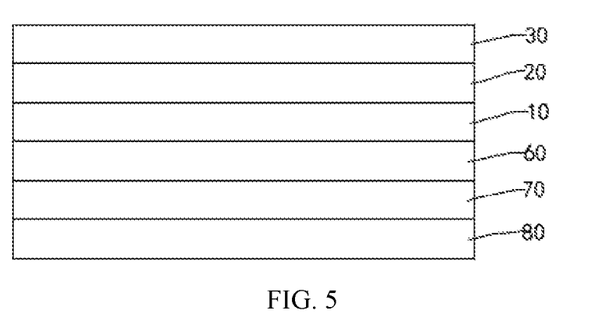
FIG. 5 is a schematic structural diagram of a fourth polarizer of an embodiment of the present disclosure.

In another embodiment, refer to FIG. 5, which is a schematic structural diagram of a fourth polarizer of an embodiment of the present disclosure. It can be understood that the polarizer of this embodiment has the same or similar features as the polarizer of the foregoing embodiments. The functions and effects of the related technical features in the above-mentioned embodiments are also applicable in this embodiment.

The polarizer of this embodiment includes a linear polarization layer 10, a first hydrophobic layer 20, a first protection layer 30, a first adhesive layer 60, a compensation layer 70, and a second adhesive layer 80. The first hydrophobic layer 20 is disposed on a first surface of the linear polarization layer 10. The first protection layer 30 is disposed on a surface of the first hydrophobic layer 20 away from the linear polarization layer 10. The first adhesive layer 60 is disposed on a second surface of the linear polarization layer 10. The first surface is opposite to the second surface. The compensation layer 70 is disposed on a surface of the first adhesive layer 60 away from the linear polarization layer 10. The second adhesive layer 80 is disposed on a surface of the compensation layer 70 away from the first adhesive layer 60. In use, the polarizer is combined and fixed with a light-emitting element through the second adhesive layer 80, so as to adjust light emitted by the light-emitting element.

The linear polarization layer 10 includes $I_3^-$ complex, $I_5^-$ complex, and polyvinyl alcohol resins (PVA resins). The first hydrophobic layer 20 is disposed on the surface of the linear polarization layer 10, which has hydrophobic and adhesive properties. The first protection layer 30 is adhered and fixed to the first surface of the linear polarization layer 10 through the first hydrophobic layer 20. The first protection layer 30 is used to protect the linear polarization layer 10 to prevent the linear polarization layer 10 from being worn by external forces. In this embodiment, the first hydrophobic layer 20 is disposed between the linear polarization layer 10 and the first protection layer 30. The connection between the linear polarization layer 10 and the first protection layer 30 is realized by using the adhesion property of the first hydrophobic layer 20. The hydrophobic property of the first hydrophobic layer 20 is used to prevent human sweat from penetrating into an interior of the polarizer. Thus, it prevents $NH_4^+$ in human sweat from reacting with the $I_3^-$ complex and the $I_5^-$ complex in the linear polarization layer 10 to cause the polarizer to fail.

Material of the linear polarization layer 10 is polyvinyl alcohol (PVA). Material of the first protection layer 30 is tri-acetyl cellulose. The first hydrophobic layer 20 may be made of a flexible adhesive. When the first hydrophobic layer 20 prevents sweat from corroding the linear polarization layer 10, it uses its own adhesiveness and flexibility to increase the degree of adhesion and stability between the first protection layer 30 and the linear polarization layer 10, and further to increase the ability of the polarizer to resist sweat corrosion. Alternatively, the first hydrophobic layer 20 and the second hydrophobic layer 40 may both be made of an organosilicone pressure sensitive adhesive.

The first adhesive layer 60 is used to realize the connection between the linear polarization layer 10 and the compensation layer 70. The second adhesive layer 80 is used to realize the connection between the polarizer and the external light-emitting element. The first adhesive layer 60 and the second adhesive layer 80 can both be made of acrylic glue. The compensation layer 70 may include a ¼ wavelength phase difference layer. The compensation layer 70 and the linear polarization layer 10 work together to reduce reflection.

In this embodiment, the first hydrophobic layer 20 can completely cover the first surface of the linear polarization layer 10 to form an effective protection for the surface. Furthermore, the first hydrophobic layer 20 may also cover at least one side surface of the linear polarization layer 10 adjacent to the first surface, thereby protecting the side surface of the linear polarization layer 10 and preventing sweat from corroding the linear polarization layer 10 from the side surface of the polarizer. Furthermore, the first hydrophobic layer 20 may also cover all side surfaces of the linear polarization layer 10 adjacent to the first surface, and cover a surface of the linear polarization layer 10 opposite to the first surface. The first hydrophobic layer 20 forms a coating structure for the linear polarization layer 10, thereby comprehensively protecting the linear polarization layer 10, and further improving the sweat corrosion resistance of the polarizer.

Figure 6:
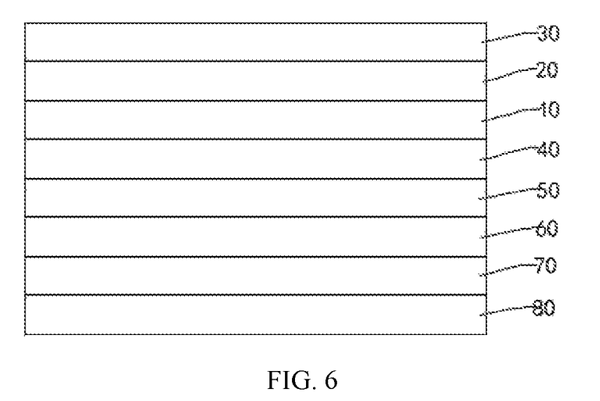
FIG. 6 is a schematic structural diagram of a fifth polarizer of an embodiment of the present disclosure.

In another embodiment, refer to FIG. 6, which is a schematic structural diagram of a fifth polarizer of an embodiment of the present disclosure. It can be understood that the polarizer of this embodiment has the same or similar features as the polarizer of the foregoing embodiments. The functions and effects of the related technical features in the above-mentioned embodiments are also applicable in this embodiment.

The polarizer of this embodiment includes a linear polarization layer 10, a first hydrophobic layer 20, a first protection layer 30, a second hydrophobic layer 40, a second protection layer 50, a first adhesive layer 60, a compensation layer 70, and a second adhesive layer 80. The first hydrophobic layer 20 is disposed on a first surface of the linear polarization layer 10. The first protection layer 30 is disposed on a surface of the first hydrophobic layer 20 away from the linear polarization layer 10. The second hydrophobic layer 40 is disposed on a second surface of the linear polarization layer 10. The first surface is opposite to the second surface. The second protection layer 50 is disposed on a surface of the second hydrophobic layer 40 away from the linear polarization layer 10. The first adhesive layer 60 is disposed on a surface of the second protection layer 50 away from the second hydrophobic layer 40. The compensation layer 70 is disposed on a surface of the first adhesive layer 60 away from the second protection layer 50. The second adhesive layer 80 is disposed on a surface of the compensation layer 70 away from the first adhesive layer 60. In use, the polarizer is combined and fixed with a light-emitting element through the second adhesive layer 80, so as to adjust light emitted by the light-emitting element.

The linear polarization layer 10 includes $I_3^-$ complex, $I_5^-$ complex, and polyvinyl alcohol resins (PVA resins). The first hydrophobic layer 20 and the second hydrophobic layer 40 are respectively disposed on the opposite surfaces of the linear polarization layer 10, which have hydrophobic and adhesive properties. The first protection layer 30 is adhered and fixed to the first surface of the linear polarization layer 10 through the first hydrophobic layer 20. The second protection layer 50 is adhered and fixed to the second surface of the linear polarization layer 10 through the second hydrophobic layer 40. The first protection layer 30 and the second protection layer 50 are used to protect the linear polarization layer 10 to prevent the linear polarization layer 10 from being worn by external forces. In this embodiment, the hydrophobic property of the first hydrophobic layer 20 and the second hydrophobic layer 40 is used to prevent human sweat from penetrating into an interior of the polarizer. Thus, it prevents $NH_4^+$ in human sweat from reacting with the $I_3^-$ complex and the $I_5^-$ complex in the linear polarization layer 10 to cause the polarizer to fail.

Material of the linear polarization layer 10 is polyvinyl alcohol. Material of the first protection layer 30 is tri-acetyl cellulose. The first hydrophobic layer 20 and the second hydrophobic layer 40 may be made of a flexible adhesive. When the first hydrophobic layer 20 and the second hydrophobic layer 40 prevent sweat from corroding the linear polarization layer 10, they use their own adhesiveness and flexibility to increase the degree of adhesion and stability between the first protection layer 30 and the second protection layer 50 with the linear polarization layer 10, and further to increase the ability of the polarizer to resist sweat corrosion. Alternatively, the first hydrophobic layer 20 and the second hydrophobic layer 40 may both be made of an organosilicone pressure sensitive adhesive.

The first adhesive layer 60 is used to realize the connection between the second protection layer 50 and the compensation layer 70. The second adhesive layer 80 is used to realize the connection between the polarizer and the external light-emitting element. The first adhesive layer 60 and the second adhesive layer 80 can both be made of acrylic glue. The compensation layer 70 may include a ¼ wavelength phase difference layer. The compensation layer 70 and the linear polarization layer 10 work together to reduce reflection.

Alternatively, on at least one side surface of the linear polarization layer 10, the first hydrophobic layer 20 and the second hydrophobic layer 40 are connected. Thus, the first hydrophobic layer 20 and the second hydrophobic layer 40 together coat the side surface of the linear polarization layer 10 to protect the side surface of the linear polarization layer 10 and prevent sweat from corroding the linear polarization layer 10 from the side surface of the polarizer. Furthermore, the first hydrophobic layer 20 and the second hydrophobic layer 40 can also be connected all around the linear polarization layer 10. Thus, the first hydrophobic layer 20 and the second hydrophobic layer 40 form a coating structure for the linear polarization layer 10. The overall protection of the linear polarization layer 10 is realized, and the ability of the polarizer to resist sweat corrosion is further improved.

The following takes the polarizer structure shown in FIG. 6, and the first hydrophobic layer 20 and the second hydrophobic layer 40 form a surrounding structure for the linear polarization layer 10 as an example to test its anti-sweat corrosion ability. Test objects are selected as an ordinary polarizer PL1, the polarizer PL2 of the present disclosure, a combination M1 of a traditional polarizer and a display module, and a combination M2 of the polarizer and the display module of the present disclosure. The discoloration of their edges in high-temperature and high-humidity environments and in alkaline synthetic sweat is tested. A formula of the alkaline artificial sweat is: 2.5 g sodium chloride (NaCl), 2.19 g ammonium chloride ($NH_4Cl$), 0.63 g urea, 1.88 g lactic acid, 0.32 g acetic acid, 125 ml pure water, adjusting a pH to 9.5 with sodium hydroxide. Test conditions for high temperature and high humidity environment are tested at 65 degrees Celsius and 95% humidity for 24 hours. Test conditions for the alkaline artificial sweat are tested at 55 degrees Celsius and 95% humidity for 48 hours. Test results are as follows:

| test conditions | | PL1 | PL2 | M1 | M2 |
|---|---|---|---|---|---|
| high temperature and high humidity | distance of edge discoloration (μm) | 800 | 450 | 550 | 100 |
| artificial sweat | | 1500 | 650 | 1000 | 200 |

In the above table, a value of the distance of edge discoloration reflects the difference of an ability to resist sweat corrosion of the polarizer. The smaller the distance of edge discoloration, the stronger the ability to resist sweat corrosion. It can be seen that the polarizer PL2 of the present disclosure and the combination M2 of the polarizer and the display module of the present disclosure show better anti-edge discoloration effects in high temperature and high humidity environments and in the alkaline artificial sweat.

Figure 7:
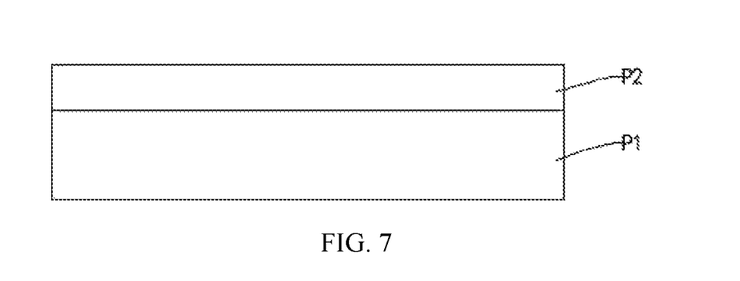
FIG. 7 is a schematic structural diagram of a display device of an embodiment of the present disclosure.

An embodiment of the present disclosure also provides a display device. Referring to FIG. 7, the display device includes a display panel P1 and a polarizing structure P2 disposed on a light-emitting side of the display panel. The polarizing structure P2 may be the polarizer of any of the above embodiments.

It should be noted that although the present disclosure is disclosed in specific embodiments as above, the above-mentioned embodiments are not intended to limit the present disclosure. Those of ordinary skill in the art can make various changes and modifications without departing from the spirit and scope of the present disclosure. Therefore, the protection scope of the present disclosure is subject to the scope defined by the claims.

What is claimed is:

1. A polarizer, comprising:
   a linear polarization layer;
   a first hydrophobic layer disposed on a first surface of the linear polarization layer;
   a first protection layer disposed on a surface of the first hydrophobic layer away from the linear polarization layer;
   a first adhesive layer disposed on a surface of the linear polarization layer away from the first hydrophobic layer; and
   a compensation layer disposed on a surface of the first adhesive layer away from the linear polarization layer;
   wherein, the compensation layer comprises a ¼ wavelength phase difference layer.

2. The polarizer according to claim 1, further comprising a second hydrophobic layer and a second protection layer;
   wherein the second hydrophobic layer is disposed on a second surface of the linear polarization layer, and the first surface is opposite to the second surface; and
   wherein the second protection layer disposed on a surface of the second hydrophobic layer away from the linear polarization layer.

3. The polarizer according to claim 2, wherein the second hydrophobic layer completely covers the second surface of the linear polarization layer.

4. The polarizer according to claim 2, wherein the first hydrophobic layer is connected to the second hydrophobic layer on at least one side surface of the linear polarization layer.

5. The polarizer according to claim 2, wherein the first hydrophobic layer and the second hydrophobic layer coat the linear polarization layer.

6. The polarizer according to claim 2, wherein the first hydrophobic layer comprises a flexible adhesive.

7. The polarizer according to claim 6, wherein the first hydrophobic layer comprises an organosilicone pressure sensitive adhesive, and the first protection layer is adhered to the linear polarization layer through the first hydrophobic layer.

8. The polarizer according to claim 2, wherein the second hydrophobic layer comprises a flexible adhesive.

9. The polarizer according to claim 8, wherein the second hydrophobic layer comprises an organosilicone pressure sensitive adhesive, and the second protection layer is adhered to the linear polarization layer through the second hydrophobic layer.

10. The polarizer according to claim 2, further comprising:
    a second adhesive layer disposed on a surface the compensation layer away from the first adhesive layer.

11. The polarizer according to claim 1, wherein the first hydrophobic layer completely covers the first surface of the linear polarization layer.

12. The polarizer according to claim 1, further comprising:
    a second adhesive layer disposed on a surface of the compensation layer away from the first adhesive layer.

13. The polarizer according to claim 1, wherein the linear polarization layer comprises I3-complex and I5-complex.

14. The polarizer according to claim 1, wherein material of the linear polarization layer comprises polyvinyl alcohol.

15. The polarizer according to claim 1, wherein material of the first protection layer comprises tri-acetyl cellulose.

16. A display device, comprising a display panel and a polarizer disposed on a light-emitting side of the display panel, wherein the polarizer comprises:
    a linear polarization layer;
    a first hydrophobic layer disposed on a first surface of the linear polarization layer;
    a first protection layer disposed on a surface of the first hydrophobic layer away from the linear polarization layer;
    a first adhesive layer disposed on a surface of the linear polarization layer away from the first hydrophobic layer; and
    a compensation layer disposed on a surface of the first adhesive layer away from the linear polarization layer;
    wherein, the compensation layer comprises a ¼ wavelength phase difference layer.

17. The display device according to claim 16, wherein the polarizer further comprises a second hydrophobic layer and a second protection layer;
    wherein the second hydrophobic layer is disposed on a second surface of the linear polarization layer, and the first surface is opposite to the second surface; and
    wherein the second protection layer disposed on a surface of the second hydrophobic layer away from the linear polarization layer.

18. The display device according to claim 17, wherein the first hydrophobic layer completely covers the first surface of the linear polarization layer, and the second hydrophobic layer completely covers the second surface of the linear polarization layer.

19. The display device according to claim 18, wherein the first hydrophobic layer and the second hydrophobic layer coat the linear polarization layer.

20. A polarizer, comprising:
- a linear polarization layer;
- a first hydrophobic layer disposed on a first surface of the linear polarization layer;
- a first protection layer disposed on a surface of the first hydrophobic layer away from the linear polarization layer;
- a first adhesive layer disposed on a surface of the linear polarization layer away from the first hydrophobic layer;
- a compensation layer disposed on a surface of the first adhesive layer away from the linear polarization layer;
- a second hydrophobic layer disposed a second surface of the linear polarization layer, wherein the first surface is opposite to the second surface; and
- a second protection layer disposed on a surface of the second hydrophobic layer away from the linear polarization layer;
- wherein the first hydrophobic layer comprises an organosilicone pressure sensitive adhesive, and the second hydrophobic layer comprises an organosilicone pressure sensitive adhesive; and
- wherein, the compensation layer comprises a ¼ wavelength phase difference layer.

* * * * *